(12) United States Patent
Li et al.

(10) Patent No.: US 12,513,426 B2
(45) Date of Patent: Dec. 30, 2025

(54) IMAGE SENSOR, CAMERA MODULE, AND ELECTRONIC DEVICE

(71) Applicant: VIVO MOBILE COMMUNICATION CO., LTD., Dongguan (CN)

(72) Inventors: Peide Li, Dongguan (CN); Kongming Hu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 242 days.

(21) Appl. No.: 18/323,656

(22) Filed: May 25, 2023

(65) Prior Publication Data

US 2023/0300491 A1  Sep. 21, 2023

Related U.S. Application Data

(63) Continuation of application No. PCT/CN2021/132700, filed on Nov. 24, 2021.

(30) Foreign Application Priority Data

Nov. 30, 2020 (CN) .......................... 202011373308.2

(51) Int. Cl.
*H04N 25/75* (2023.01)
*H04N 23/71* (2023.01)
(Continued)

(52) U.S. Cl.
CPC ............. *H04N 25/75* (2023.01); *H04N 23/71* (2023.01); *H04N 23/76* (2023.01); *H04N 25/772* (2023.01)

(58) Field of Classification Search
None
See application file for complete search history.

(56) References Cited

U.S. PATENT DOCUMENTS 6,339,363 B1    1/2002   Fowler
7,009,639 B1    3/2006   Une et al.
(Continued)

FOREIGN PATENT DOCUMENTS

CN    101521755 A    9/2009
CN    103053164 A    4/2013
(Continued)

OTHER PUBLICATIONS

International Search Report & Written Opinion related to Application No. PCT/CN2021/132700; reported on Feb. 17, 2022.
(Continued)

*Primary Examiner* — Mark T Monk
(74) *Attorney, Agent, or Firm* — von Briesen & Roper, s.c.

(57) ABSTRACT

This application relates to the technical field of image processing, and discloses an image sensor, a camera module, and an electronic device. The image sensor includes a pixel array and a plurality of amplifiers. The pixel array includes a plurality of pixel groups arranged in a row direction and/or a column direction, each pixel group includes a plurality of pixels of different colors, and each amplifier is in a one-to-one correspondence with each pixel, where an input end of a target amplifier is connected to an output end of a target pixel, an output end of the target amplifier is connected to a column line in which the target pixel is located, the target amplifier is any one of the plurality of amplifiers, and the target pixel is a pixel corresponding to the target amplifier.

20 Claims, 2 Drawing Sheets

(51) Int. Cl.
*H04N 23/76* (2023.01)
*H04N 25/772* (2023.01)

(56) References Cited

U.S. PATENT DOCUMENTS

| | | | |
|---|---|---|---|
| 7,098,945 B1 * | 8/2006 | Sasai | H04N 23/88 348/255 |
| 8,902,343 B1 | 12/2014 | Mandelli | |
| 9,106,851 B2 | 8/2015 | Fenigstein et al. | |
| 2006/0146159 A1 * | 7/2006 | Farrier | H10F 39/802 348/E3.018 |
| 2010/0079611 A1 * | 4/2010 | Suzuki | H04N 25/134 348/E5.022 |
| 2012/0188427 A1 | 7/2012 | Solhusvik | |
| 2012/0229669 A1 | 9/2012 | Okada et al. | |
| 2013/0313413 A1 | 11/2013 | Kato | |
| 2014/0027620 A1 | 1/2014 | Takeda | |
| 2014/0139709 A1 | 5/2014 | Tanaka | |
| 2016/0165164 A1 | 6/2016 | Harada | |
| 2017/0213867 A1 | 7/2017 | Roos | |
| 2018/0152646 A1 | 5/2018 | Tang | |
| 2018/0191974 A1 | 7/2018 | Shim et al. | |
| 2018/0255215 A1 | 9/2018 | Lee | |
| 2019/0238774 A1 * | 8/2019 | Kono | H04N 25/78 |

FOREIGN PATENT DOCUMENTS

| | | |
|---|---|---|
| CN | 103460687 A | 12/2013 |
| CN | 105681691 A | 6/2016 |
| CN | 106412407 A | 2/2017 |
| CN | 112492162 A | 3/2021 |
| DE | 19652477 A1 | 6/1998 |
| JP | 2000253410 A | 9/2000 |
| JP | 2009225315 A | 10/2009 |
| JP | 2010252390 A | 11/2010 |
| JP | 2010278603 A | 12/2010 |
| KR | 20180079519 A | 7/2018 |
| KR | 20180085024 A | 7/2018 |
| KR | 20180102231 A | 9/2018 |

OTHER PUBLICATIONS

First Chinese Office Action for related Application No. 202011373308.2; reported on Sep. 29, 2021.
Extended European Search Report related to Application No. 21897009.3; reported on Jan. 8, 2024.
Japanese first Office Action related to Application No. 2023-532577; reported on Jun. 26, 2024.
First Korean Office Action related to Application No. 10-2023-7021166; reported on Jul. 31, 2025.
First Indian Office Action related to Application No. 202317041174; reported on Oct. 23, 2025.

* cited by examiner

IMAGE SENSOR, CAMERA MODULE, AND ELECTRONIC DEVICE

CROSS-REFERENCE TO RELATED APPLICATIONS

The present invention is a continuation application of PCT International Application No. PCT/CN2021/132700 filed on Nov. 24, 2021, which claims priority to Chinese Patent Application No. 202011373308.2, filed with the China National Intellectual Property Administration on Nov. 30, 2020, and entitled "IMAGE SENSOR, CAMERA MODULE, AND ELECTRONIC DEVICE", which is incorporated herein by reference in its entirety.

TECHNICAL FIELD

This application pertains to the technical field of image processing, and specifically relates to an image sensor, a camera module, and an electronic device.

BACKGROUND

With popularization of mobile terminal products, market competition of mobile terminal products is increasingly fierce, especially in terms of photographing of smartphones, for example, in terms of improvements of signal-to-noise ratios of images in smartphones.

In the related art, to improve a signal-to-noise ratio of an image, on one hand, a true signal-to-noise ratio of an image sensor is improved as much as possible, and on the other hand, noise caused when a raw image output by the image sensor is processed by using an image algorithm in an image processor or image signal processor (ISP) is suppressed as much as possible.

However, when the image algorithm in the ISP is used to process the raw image, more noise is often caused, resulting in image deterioration.

SUMMARY

According to a first aspect, an embodiment of this application provides an image sensor, including a pixel array and a plurality of amplifiers, where the pixel array includes a plurality of pixel groups arranged in a row direction and/or a column direction, each pixel group includes a plurality of pixels of different colors, and each amplifier is in a one-to-one correspondence with each pixel, where an input end of a target amplifier is connected to an output end of a target pixel, an output end of the target amplifier is connected to a column line in which the target pixel is located, the target amplifier is any one of the plurality of amplifiers, and the target pixel is a pixel corresponding to the target amplifier.

According to a second aspect, an embodiment of this application provides a camera module, including the image sensor according to the first aspect, where a lens group in the camera module is disposed in a correspondence with the image sensor.

According to a third aspect, an embodiment of this application provides an electronic device, where the electronic device includes the image sensor according to the first aspect.

BRIEF DESCRIPTION OF DRAWINGS

The foregoing and/or additional aspects and advantages of this application will become apparent and comprehensible from the description of the embodiments with reference to the following drawings.

DESCRIPTION OF EMBODIMENTS

Figure 1A:
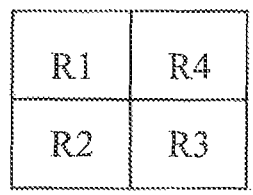
FIG. 1a and FIG. 1B are respectively schematic diagrams of pixels included in a pixel group according to an exemplary embodiment of this application.

The embodiments of this application are described in detail below. Examples of the embodiments are shown in the accompanying drawings, and the same or similar reference signs indicate the same or similar components or components with the same or similar functions. The embodiments described below with reference to the drawings are exemplary and only used to explain this application, but cannot be understood as a limitation on this application. All other embodiments obtained by a person of ordinary skill in the art based on the embodiments of this application without creative efforts shall fall within the protection scope of this application.

Features of the terms "first" and "second" in the specification and claims of this application may include one or more of the features explicitly or implicitly. In the descriptions of this application, unless otherwise stated, "a plurality of" means at least two. In addition, the term "and/or" in the specification and claims indicates at least one of connected objects, and the character "I" generally represents an "or" relationship between associated objects.

In the descriptions of this application, it should be understood that orientations or positional relationships indicated by the terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on orientations or positional relationships shown in the accompanying drawings, are merely intended to facilitate the descriptions of this application and simplify the descriptions, are not intended to indicate or imply that the apparatuses or components mentioned in this application must have specific orientations or be constructed and operated for a specific orientation, and therefore shall not be construed as a limitation on this application.

In the descriptions of this application, it should be noted that unless otherwise specified and defined explicitly, the term "installation", "link", or "connection" should be understood in its broad sense. For example, the term may be a fixed connection, a detachable connection, or an integrated connection, or may be a mechanical connection or an electrical connection, or may be a direct connection, an indirect connection through an intermediate medium, or an internal connection between two components. A person of ordinary skill in the art can understand specific meanings of the terms in this application based on specific situations.

An exemplary embodiment of this application provides an image sensor. The image sensor is a semiconductor that may be configured to record light changes. The image sensor may be a complementary metal oxide semiconductor (CMOS) image sensor, a charge coupled device (CCD) image sensor, a quantum film image sensor, or the like.

In this embodiment, the image sensor may include a pixel array and amplifiers, where the pixel array includes a plurality of pixel groups (for example, at least two pixel groups) arranged in a row direction and/or a column direction, each pixel group may include a plurality of pixels of different colors, such as a red photosensitive pixel, a green photosensitive pixel, and a blue photosensitive pixel, and each amplifier is in a one-to-one correspondence with each pixel.

An input end of a target amplifier is connected to an output end of a target pixel, an output end of the target amplifier is connected to a column line in which the target pixel is located, the target amplifier is any one of the plurality of amplifiers, and the target pixel is a pixel corresponding to the target amplifier. Therefore, a pixel channel corresponding to the target pixel can be controlled separately, and each pixel channel can be amplified independently, so that the image sensor can have a function for implementing image processing (such as brightness uniformity (lens shading) processing). In other words, in this application, an amplifier is added in the image sensor, so that an image amplification operation in an ISP can be implemented in the front-end image sensor, to reduce noise components at the front end, suppress image noise, improve final image quality, increase a signal-to-noise ratio, and improve user experience.

Figure 1B:
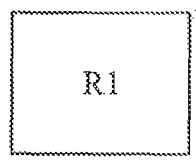

In this embodiment, the target pixel may be but is not limited to a red photosensitive pixel, a blue photosensitive pixel, a green photosensitive pixel, or the like. It may be understood that a pixel of a different color included in each pixel group may include at least one sub-pixel. For example, assuming that the pixel group includes a red photosensitive pixel, a green photosensitive pixel, and a blue photosensitive pixel, and using the red photosensitive pixel as an example herein, the red photosensitive pixel may include a total of four red photosensitive sub-pixels R1, R2, R3, and R4 shown in FIG. 1a, or may include only one red photosensitive pixel R1 shown in FIG. 1B. This is not limited herein in this embodiment. In addition, in the pixel array, arrangements of the pixels of different colors in each pixel group may be the same or different.

Further, the amplifier may be but is not limited to an operational amplifier or the like. A gain of the amplifier may be set based on an actual requirement. For example, when a shooting environment changes, image quality can be ensured by adjusting the gain of the amplifier, that is, the gain of the amplifier is adjustable.

In an implementation, based on different requirements for a gain of each pixel channel, only an output of a target pixel (such as a red photosensitive pixel, a blue photosensitive pixel, or a green photosensitive pixel) in a row in the pixel array may be amplified by using one amplifier, or outputs of target pixels in a plurality of rows in the pixel array may be separately amplified by using a plurality of amplifiers, or outputs of a plurality of target pixels of different colors may be simultaneously amplified by using a plurality of amplifiers corresponding to the pixels of different colors. This is not limited in this embodiment.

On a basis of the foregoing embodiment, in a possible implementation, each pixel group may include a first pixel, a second pixel, and a third pixel, and correspondingly, the amplifiers may include a first amplifier, a second amplifier, and a third amplifier.

An input end of the first amplifier is connected to an output end of the first pixel, and an output end of the first amplifier is connected to a column line in which the first pixel is located; an input end of the second amplifier is connected to an output end of the second pixel, and an output end of the second amplifier is connected to a column line in which the second pixel is located; and an input end of the third amplifier is connected to an output end of the third pixel, and an output end of the third amplifier is connected to a column line in which the third pixel is located. Because amplifiers corresponding to different pixels are added in the image sensor to amplify outputs of different pixel channels, the image sensor has a function for controlling each pixel channel separately, thereby implementing image processing functions such as image brightness uniformity processing, improving the final image quality, increasing the signal-to-noise ratio, and improving user experience. It may be understood that in this implementation, the first pixel, the second pixel, and the third pixel are the corresponding red photosensitive pixel, green photosensitive pixel, and blue photosensitive pixel respectively, that is, the pixel group including the first pixel, the second pixel, and the third pixel is a three-channel pixel group.

In another possible implementation, each pixel group may include a first pixel, a second pixel, and a third pixel, and the second pixel includes a first sub-pixel and a second sub-pixel; and correspondingly, the amplifiers may include a first amplifier, a second amplifier, and a third amplifier, and the second amplifier includes a first sub-amplifier and a second sub-amplifier.

An input end of the first amplifier is connected to an output end of the first pixel, and an output end of the first amplifier is connected to a column line in which the first pixel is located; an input end of the first sub-amplifier is connected to an output end of the first sub-pixel, and an output end of the first sub-amplifier is connected to a column line in which the first sub-pixel is located; an input end of the second sub-amplifier is connected to an output end of the second sub-pixel, and an output end of the second sub-amplifier is connected to a column line in which the second sub-pixel is located; and an input end of the third amplifier is connected to an output end of the third pixel, and an output end of the third amplifier is connected to a column line in which the third pixel is located. It may be understood that in this implementation, the first pixel and the third pixel correspond to the red photosensitive pixel and blue photosensitive pixel, and that both the first sub-pixel and the second sub-pixel correspond to the green photosensitive pixel, that is, the pixel group including the first pixel, the first sub-pixel, the second sub-pixel, and the third pixel is a four-channel pixel group.

Figure 2:
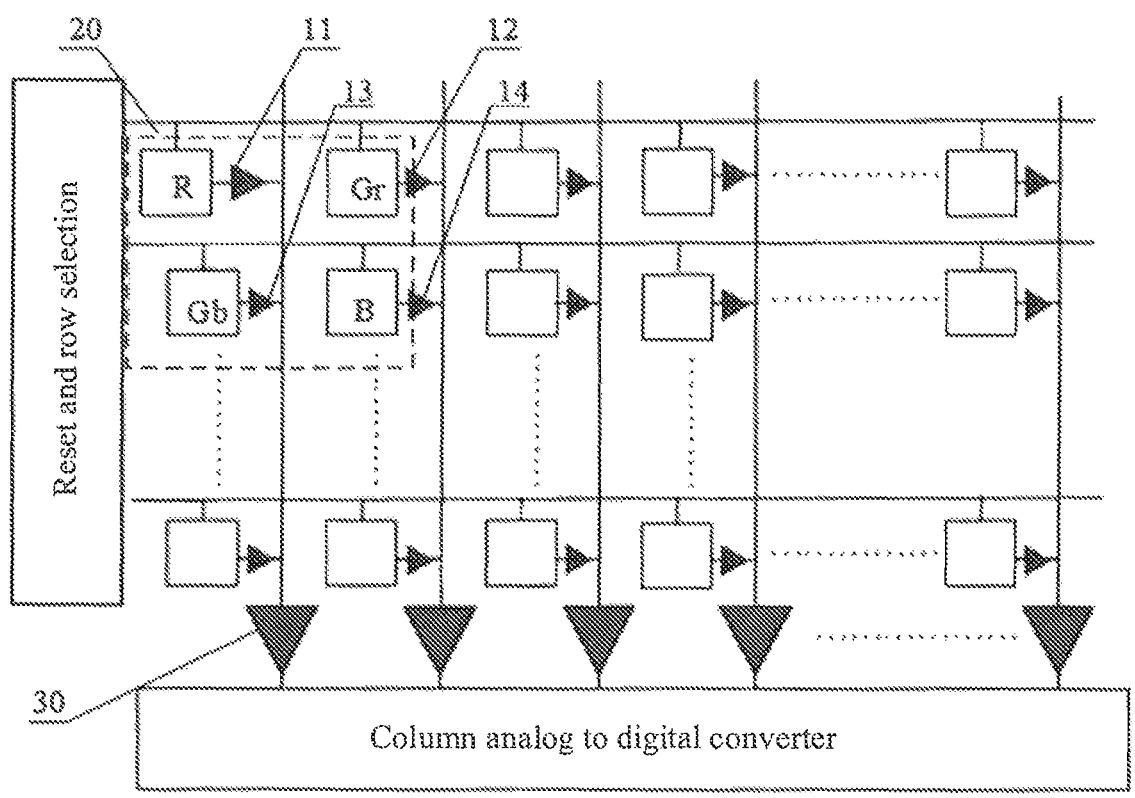
FIG. 2 is a schematic diagram of a structure of an image sensor according to an exemplary embodiment of this application.

For example, referring to FIG. 2, a four-channel pixel group is used as an example herein to describe a connection mode of an amplifier in the image sensor. It is assumed that a first pixel included in a pixel group 20 is a red photosensitive pixel (R), and that first sub-pixel and second sub-pixel are both green photosensitive pixels (Gr and Gb), and that a third pixel is a blue photosensitive pixel (B). In this case, an output of the R pixel is connected to the input end of the first amplifier 11, and the output is amplified by the first amplifier and then connected back to a column line in which the R pixel is located; an output of the Gr pixel is connected to the input end of the first sub-amplifier 12, and the output is amplified by the first sub-amplifier and then connected back to a column line in which the Gr pixel is located; an output of the Gb pixel is connected to the input end of the second sub-amplifier 13, and the output is amplified by the second sub-amplifier and then connected back to a column line in which the Gb pixel is located; an output of the B pixel is connected to the input end of the third amplifier 14, and the output is amplified by the third amplifier and then connected back to a column line in which the B pixel is located; and finally, a column amplifier 30 completes subsequent column amplification (column amplification means amplifying all signals in the image sensor; this column amplifier can only amplify all the signals as a whole, but cannot amplify a channel separately), and an analog to digital converter (ADC) completes conversion. In this case, the first amplifier, the first sub-amplifier, the second sub-amplifier, and the third amplifier respectively control pixel channels corresponding to different colors, so that the image sensor has image processing functions such as brightness uniformity processing.

Gains of the first amplifier, the second amplifier (or the first sub-amplifier and the second sub-amplifier), and the third amplifier may be set based on an actual requirement. Details are hereinafter described with reference to different examples.

Example 1: Considering that when the ISP processes through a lens shading module, image brightness becomes increasingly dark from the center to four corners due to characteristics of lens shading, in this embodiment, a brightness gain matrix needed to compensate for lens shading is calculated, and then the brightness gain matrix is mapped to each amplifier to implement a lens shading compensation function at the image sensor. In other words, in this embodiment, a gain of each amplifier may be determined based on the brightness gain matrix. The brightness gain matrix is obtained, by using the image processor (ISP), by calculating brightness uniformity of a raw image output by the image sensor. Therefore, the lens shading compensation function of the image sensor can be implemented, to reduce noise components at the front end, avoid lens shading compensation processing at the ISP, suppress image noise, improve the final image quality, increase the signal-to-noise ratio, and improve user experience.

In an implementation, the foregoing implementation process may include: first, obtaining a first raw image by using the image sensor; then inputting the first raw image into the ISP, and processing the first raw image by using a brightness uniformity algorithm, to obtain a brightness gain matrix; then setting the brightness gain matrix as the gain of each amplifier in the image sensor; and finally, obtaining a second raw image by using the image sensor again. In this case, the second raw image is an image on which brightness uniformity processing has been performed, that is, an automatic brightness uniformity processing function of the image sensor is implemented. When the environment changes, the foregoing steps can be repeated to complete dynamic refreshing of the brightness uniformity processing of the image sensor.

Example 2: If both the first sub-pixel and the second sub-pixel are green photosensitive pixels (such as Gr and Gb), a gain of the first sub-amplifier is different from a gain of the second sub-amplifier. For example, if a Gr channel and a Gb channel are processed by using different gains, a dynamic range of the image sensor can be improved, although a resolution of the image sensor is sacrificed. It may be understood that if signals of the Gr channel and the Gb channel in the image sensor are closer, the resolution of the image sensor is higher, and image quality of an image signal output by the image sensor is better.

That a gain of the first sub-amplifier is different from a gain of the second sub-amplifier may include that there is a multiple relationship (multiple difference) between the gain of the first sub-amplifier and the gain of the second sub-amplifier. For example, the gain of the first sub-amplifier and the gain of the second sub-amplifier corresponding to the Gr channel and the Gb channel may be set to an integer multiple difference, such as 2×, 3×, or 4×. This is not limited herein. Therefore, the dynamic range of the image sensor is effectively improved.

It should be noted that the multiple relationship may be determined based on a target shooting scene, where the target shooting scene includes a portrait shooting scene and/or a sky shooting scene or the like. This is not limited in this embodiment.

For example, a face sky scene is used as an example herein. When a user takes selfies with a front camera on a smart product such as a mobile phone, the user often encounters a face sky scene. Generally, a 1× gain is required for the Gb channel to ensure normal exposure of the sky, but a face is underexposed. In this case, the Gr channel and the Gb channel can support processing with different gains, for example, the sky (that is, the sky scene) is processed by using a 1× gain of the Gr channel, while the face can be processed by using a 4× gain of the Gb channel, that is, there is a 4× relationship between the gain of the first sub-amplifier and the gain of the second sub-amplifier. Therefore, both the sky and the face can be in a normal exposure state, quality of the image output by the image sensor can be improved, and user experience is ensured.

It should be noted that in the foregoing implementations, gains of a plurality of target amplifiers are the same or different, where the plurality of target amplifiers correspond to pixels of a same color, and the target amplifier may be the first amplifier, the second amplifier (including the first sub-amplifier or the second sub-amplifier), or the third amplifier. For example, using the first amplifier as an example, gains of a plurality of first amplifiers may be the same or different, and may be set based on an actual requirement. This is not limited in this embodiment.

On a basis of the image sensor provided in the foregoing implementations, in a possible implementation, the image sensor may further include a micro-lens and a color filter. The micro-lens is configured to focus light on each photodiode in a light pixel array. The color filter is configured to filter incident light, only allowing light of a waveband corresponding to a color of the color filter to pass. When illuminated, the photodiode generates an electrical charge and converts the light into an electrical signal.

Further, an exemplary embodiment of this application further provides a camera module. The camera module includes the image sensor provided in the foregoing embodiment, and a lens group in the camera module is disposed in a correspondence with the image sensor, so that light passing through the lens group arrives at the image sensor. It may be understood that because the image sensor included in this embodiment has technical features the same as or similar to those of the image sensor provided in the foregoing embodiment, details are not described herein again to avoid repetition.

Figure 3:
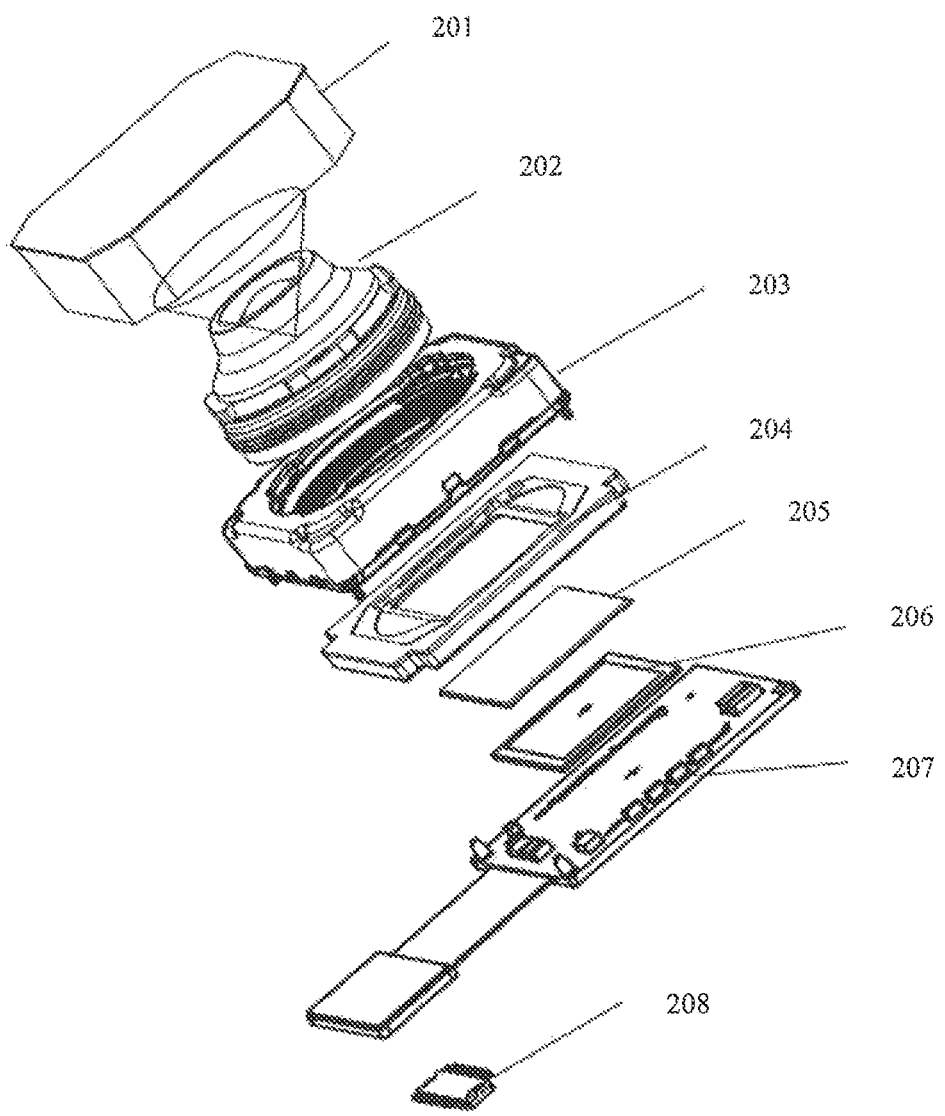
FIG. 3 is an exploded schematic diagram of a camera module according to an exemplary embodiment of this application.

For example, as shown in FIG. 3, the camera module may further include a protective film 201, a lens 202, a voice coil motor 203, a supporting part 204, an infrared filter (IR Filter) 205, an image sensor 206 provided in this application, a flexible board (FPC) 207, and a connecting part 208.

A working process of the camera module may include the following (1) to (4).

(1) The lens is used for light concentration and focusing. The lens is wrapped and fixed by the voice coil motor, and upper and lower ends of the voice coil motor are linked to a spring. During focusing, the motor is energized to generate electromagnetic force, and the electromagnetic force is finally balanced with elastic force of the spring. A location of the motor may be controlled by a magnitude of energization, and further, the lens is pushed to an in-focus position by the motor.

The voice coil motor includes an upper cover, an upper spring, a lower spring, a housing, a coil, a magnet, a moving part, a base, and a terminal. The upper cover has a protection function for a motor. When deformed, the upper spring generates acting force on the motor to balance the electromagnetic force with the lower spring. The housing is a main frame of a fixed part of the motor, has a magnetic conduction function, and can improve effective utilization of the magnet. When the coil is energized, the coil generates upward thrust under action of a magnetic field of the magnet, to drive the moving part and other parts to move together. The magnet generates the magnetic field, so that the energized coil generates the electromagnetic force under the action of the magnetic field, allowing the moving part to move with the lens. When deformed, the lower spring generates acting force on the motor to balance the electromagnetic force with the upper spring. The base and the motor are directly assembled with the flexible board. A mobile phone supplies power to the motor by using the terminal.

(2) The image sensor 206 senses light.

Light is projected from an object to a color filter (IR filter) in the image sensor 206, and the IR filter filters out undesired light to prevent the image sensor 206 from generating false colors or ripples, and improve an effective resolution and color reproducibility of the image sensor. The light passing through the IR filter can be sensed by the image sensor 206.

After sensing the light, the image sensor 206 converts an optical signal into an electrical signal. The electrical signal is amplified and converted into a digital signal by an ADC, and a raw image is formed and output to an image processor ISP.

(3) The image is processed and fed back to the sensor for processing.

The raw image obtained in (2) is processed by ISP algorithm modules such as auto exposure (AE), auto focus (AF), AWB, OB, and lens shading, and a brightness gain matrix required for correct brightness uniformity processing is obtained. Then the brightness gain matrix is set as amplification gains (that is, gains) of an R channel (corresponding to a first amplifier), a Gr channel (corresponding to a first sub-amplifier), a Gb channel (corresponding to a second sub-amplifier), and a B channel (corresponding to a third amplifier) on the image sensor 206, that is, a brightness uniformity processing function setting of the image sensor 206 is completed. When an environment changes, the foregoing steps can be repeated to complete dynamic refreshing of the brightness uniformity processing of the image sensor 206.

In addition, if the gains of the Gr channel (corresponding to the first sub-amplifier) and the Gb channel (corresponding to the second sub-amplifier) are set to a multiple difference, a dynamic range of the sensor can also be improved.

(4) The image is processed and compressed for storage.

The raw image output by the image sensor 206 enters the ISP for processing, and is compressed into a JPEG image for storage or sending to a display after sharpening, noise reduction, color calibration, and other operations.

An exemplary embodiment of this application further provides an electronic device. The electronic device includes the image sensor 206 provided in the foregoing embodiment. Because the image sensor 206 included in this embodiment has technical features the same as or similar to those of the image sensor 206 provided in the foregoing embodiments, details are not described herein again to avoid repetition.

In the description of this specification, the description referring to the terms "an embodiment", "some embodiments", "an exemplary embodiment", "an example", "a specific example", or "some examples" means that a specific feature, structure, material, or characteristic described with reference to the embodiment or example is included in at least one embodiment or example of this application. In this specification, illustrative expressions of the terms do not necessarily refer to the same embodiment or example. Moreover, the specific feature, structure, material, or characteristic described may be combined in any suitable manner in any one or more embodiments or examples.

Although the embodiments of this application have been shown and described, a person of ordinary skill in the art can understand that various changes, modifications, substitutions, and variations of these embodiments may be made without departing from the principles and objectives of this application. The scope of this application is defined by the claims and their equivalents.

What is claimed is:

1. An image sensor, comprising a pixel array and a plurality of amplifiers, wherein the pixel array comprises a plurality of pixel groups arranged in a row direction and/or a column direction, each pixel group comprises a plurality of pixels of different colors, and each amplifier is in a one-to-one correspondence with each pixel, wherein
an input end of a target amplifier is connected to an output end of a target pixel, an output end of the target amplifier is connected to a column line in which the target pixel is located, the target amplifier is any one of the plurality of amplifiers, and the target pixel is a pixel corresponding to the target amplifier;
wherein the plurality of amplifiers comprises a first amplifier a second amplifier, and a third amplifier, and each pixel group comprises a first pixel, a second pixel, and a third pixel; the first amplifier, the second amplifier and the third amplifier are in a one-to-one correspondence with the first pixel, the second pixel and the third pixel;
wherein the second pixel comprises a first sub-pixel and a second sub-pixel, and the second amplifier comprises a first sub-amplifier and a second sub-amplifier; the first sub-amplifier and the second sub-amplifier are in a one-to-one correspondence with the first sub-pixel and the second sub-pixel; and a gain of the first sub-amplifier is different from a gain of the second sub-amplifier.

2. The image sensor according to claim 1, wherein
an input end of the first amplifier is connected to an output end of the first pixel, and an output end of the first amplifier is connected to a column line in which the first pixel is located;
an input end of the second amplifier is connected to an output end of the second pixel, and an output end of the second amplifier is connected to a column line in which the second pixel is located; and
an input end of the third amplifier is connected to an output end of the third pixel, and an output end of the third amplifier is connected to a column line in which the third pixel is located.

3. The image sensor according to claim 2, wherein
an input end of the first sub-amplifier is connected to an output end of the first sub-pixel, and an output end of the first sub-amplifier is connected to a column line in which the first sub-pixel is located; and an input end of the second sub-amplifier is connected to an output end of the second sub-pixel, and an output end of the second sub-amplifier is connected to a column line in which the second sub-pixel is located.

4. The image sensor according to claim 3, wherein the first sub-pixel and the second sub-pixel are both green photosensitive pixels.

5. The image sensor according to claim 1, wherein that a gain of the first sub-amplifier is different from a gain of the second sub-amplifier comprises that there is a multiple relationship between the gain of the first sub-amplifier and the gain of the second sub-amplifier.

6. The image sensor according to claim 5, wherein the multiple relationship is determined based on a target shooting scene, and the target shooting scene comprises a portrait shooting scene and/or a sky shooting scene.

7. The image sensor according to claim 1, wherein a plurality of target amplifiers has a same gain, and the plurality of target amplifiers correspond to pixels of a same color.

8. The image sensor according to claim 1, wherein a gain of each amplifier is determined based on a brightness gain matrix, and the brightness gain matrix is obtained, by using an image processor ISP, by calculating brightness uniformity of a raw image output by the image sensor.

9. The image sensor according to claim 1, wherein the gain of each amplifier is adjustable.

10. A camera module, comprising a lens group and an image sensor, wherein the lens group is disposed in a correspondence with the image sensor;

wherein the image sensor comprises a pixel array and a plurality of amplifiers, wherein the pixel array comprises a plurality of pixel groups arranged in a row direction and/or a column direction, each pixel group comprises a plurality of pixels of different colors, and each amplifier is in a one-to-one correspondence with each pixel, wherein an input end of a target amplifier is connected to an output end of a target pixel, an output end of the target amplifier is connected to a column line in which the target pixel is located, the target amplifier is any one of the plurality of amplifiers, and the target pixel is a pixel corresponding to the target amplifier;

wherein the plurality of amplifiers comprises a first amplifier a second amplifier and a third amplifier, and each pixel group comprises a first pixel, a second pixel, and a third pixel; the first amplifier, the second amplifier and the third amplifier are in a one-to-one correspondence with the first pixel, the second pixel and the third pixel;

wherein the second pixel comprises a first sub-pixel and a second sub-pixel, and the second amplifier comprises amplifier and a second sub-amplifier; the first sub-amplifier and the sub-amplifier are in a one-to-one correspondence with the first sub-pixel and the second sub-pixel; and wherein the first sub-pixel and the second sub-pixel are both green photosensitive pixels, and a gain of the first sub-amplifier is different from a gain of the second sub-amplifier.

11. The camera module according to claim 10, wherein an input end of the first amplifier is connected to an output end of the first pixel, and an output end of the first amplifier is connected to a column line in which the first pixel is located;

an input end of the second amplifier is connected to an output end of the second pixel, and an output end of the second amplifier is connected to a column line in which the second pixel is located; and an input end of the third amplifier is connected to an output end of the third pixel, and an output end of the third amplifier is connected to a column line in which the third pixel is located.

12. The camera module according to claim 11, wherein an input end of the first sub-amplifier is connected to an output end of the first sub-pixel, and an output end of the first sub-amplifier is connected to a column line in which the first sub-pixel is located; and an input end of the second sub-amplifier is connected to an output end of the second sub-pixel, and an output end of the second sub-amplifier is connected to a column line in which the second sub-pixel is located.

13. The camera module according to claim 12, wherein the first sub-pixel and the second sub-pixel are both green photosensitive pixels.

14. The camera module according to claim 10, wherein that a gain of the first sub-amplifier is different from a gain of the second sub-amplifier comprises that there is a multiple relationship between the gain of the first sub-amplifier and the gain of the second sub-amplifier.

15. The camera module according to claim 14, wherein the multiple relationship is determined based on a target shooting scene, and the target shooting scene comprises a portrait shooting scene and/or a sky shooting scene.

16. The camera module according to claim 10, wherein a plurality of target amplifiers has a same gain, and the plurality of target amplifiers correspond to pixels of a same color.

17. The camera module according to claim 10, wherein a gain of each amplifier is determined based on a brightness gain matrix, and the brightness gain matrix is obtained, by using an image processor ISP, by calculating brightness uniformity of a raw image output by the image sensor.

18. The camera module according to claim 10, wherein the gain of each amplifier is adjustable.

19. An electronic device, wherein the electronic device comprises an image sensor;

wherein the image sensor comprises a pixel array and a plurality of amplifiers, wherein the pixel array comprises a plurality of pixel groups arranged in a row direction and/or a column direction, each pixel group comprises a plurality of pixels of different colors, and each amplifier is in a one-to-one correspondence with each pixel, wherein an input end of a target amplifier is connected to an output end of a target pixel, an output end of the target amplifier is connected to a column line in which the target pixel is located, the target amplifier is any one of the plurality of amplifiers, and the target pixel is a pixel corresponding to the target amplifier;

wherein the plurality of amplifiers comprises a first amplifier, a second amplifier, and a third amplifier, and each pixel group comprises a first pixel, a second pixel, and a third pixel; the first amplifier, the second amplifier and the third amplifier are in a one-to-one correspondence with the first pixel, the second pixel and the third pixel;

wherein the second pixel comprises a first sub-pixel and a second sub-pixel and the second amplifier comprises a first sub-amplifier and a second sub-amplifier; the first sub-amplifier and second sub-amplifier are in a one-to-one correspondence with the first sub-pixel and the second sub-pixel; and wherein the first sub-pixel and the second sub-pixel are both green photosensitive pixels, and a gain of the first sub-amplifier is different from a gain of the second sub-amplifier.

20. The electronic device according to claim 19, wherein an input end of the first amplifier is connected to an output end of the first pixel, and an output end of the first amplifier is connected to a column line in which the first pixel is located;

an input end of the second amplifier is connected to an output end of the second pixel, and an output end of the second amplifier is connected to a column line in which the second pixel is located; and an input end of the third amplifier is connected to an output end of the third pixel, and an output end of the third amplifier is connected to a column line in which the third pixel is located.

* * * * *